US011420767B2

(12) United States Patent
Mizobe

(10) Patent No.: US 11,420,767 B2
(45) Date of Patent: Aug. 23, 2022

(54) RUNWAY-EMBEDDED FLASH LIGHTING DEVICE AND HEAT CONDUCTING MEMBER

(71) Applicant: HotaluX, Ltd., Tokyo (JP)

(72) Inventor: Norimasa Mizobe, Tokyo (JP)

(73) Assignee: HotaluX, Ltd., Tokyo (JP)

( * ) Notice: Subject to any disclaimer, the term of this patent is extended or adjusted under 35 U.S.C. 154(b) by 0 days.

(21) Appl. No.: 17/287,608

(22) PCT Filed: Aug. 21, 2019

(86) PCT No.: PCT/JP2019/032554
§ 371 (c)(1),
(2) Date: Apr. 22, 2021

(87) PCT Pub. No.: WO2020/084880
PCT Pub. Date: Apr. 30, 2020

(65) Prior Publication Data
US 2021/0394927 A1      Dec. 23, 2021

(30) Foreign Application Priority Data
Oct. 26, 2018   (JP) .............................. JP2018-201400

(51) Int. Cl.
*B64F 1/20*        (2006.01)
*F21V 29/503*      (2015.01)
(Continued)

(52) U.S. Cl.
CPC ................ *B64F 1/20* (2013.01); *B64D 45/08* (2013.01); *F21S 10/06* (2013.01); *F21V 5/043* (2013.01);
(Continued)

(58) Field of Classification Search
CPC ....... B64F 1/20; B64D 45/08; B64D 2203/00; F21S 10/06; F21V 5/043; F21V 15/01;
(Continued)

(56) References Cited

U.S. PATENT DOCUMENTS 3,113,726 A  * 12/1963  Pennow .................. B64F 1/205
                                                      362/153
3,624,379 A    11/1971  Bliss et al.
(Continued)

FOREIGN PATENT DOCUMENTS

CA      3 003 702 A1    5/2017
CN      101761840 A     6/2010
(Continued)

OTHER PUBLICATIONS

U.S. Appl. No. 17/287,606, Norimasa Mizobe, filed Apr. 22, 2021, (National Stage of International Application No. PCT/JP2019/032555).
(Continued)

*Primary Examiner* — Tsion Tumebo
(74) *Attorney, Agent, or Firm* — Sughrue Mion, PLLC

(57) ABSTRACT

A runway-embedded flash lighting device, includes a body configured to be embedded in a runway; a ceiling member including a flash emission window and disposed in an upper opening of the body and configured to be exposed to a runway surface when the body is embedded in the runway; a light guide member disposed in the flash emission window; an LED flash light source disposed inside the body and configured to emit a flash toward the light guide member; and a heat conducting member, wherein the light guide is configured to allow the flash emitted from the LED flash light source to be emitted from the flash emission window, the heat conducting member is disposed inside the body and
(Continued)

includes a first part in contact with the LED flash light source, and a second part in contact with the ceiling member.

12 Claims, 12 Drawing Sheets

(51) Int. Cl.
  *F21V 29/51* (2015.01)
  *F21V 29/71* (2015.01)
  *B64D 45/08* (2006.01)
  *F21S 10/06* (2006.01)
  *F21V 5/04* (2006.01)
  *F21V 15/01* (2006.01)
  *F21Y 115/10* (2016.01)
  *F21W 111/06* (2006.01)

(52) U.S. Cl.
  CPC ............ *F21V 15/01* (2013.01); *F21V 29/503* (2015.01); *F21V 29/51* (2015.01); *F21V 29/717* (2015.01); *B64D 2203/00* (2013.01); *F21W 2111/06* (2013.01); *F21Y 2115/10* (2016.08)

(58) Field of Classification Search
  CPC ...... F21V 29/503; F21V 29/51; F21V 29/717; F21W 2111/06; F21Y 2115/10
  See application file for complete search history.

(56) References Cited

U.S. PATENT DOCUMENTS

| | | | |
|---|---|---|---|
| 4,112,485 A | | 9/1978 | Sutter |
| 4,860,182 A | * | 8/1989 | Vadseth ............... F21S 8/022 362/364 |
| 6,669,351 B1 | | 12/2003 | Shea et al. |
| 2003/0048634 A1 | * | 3/2003 | You .................. F21V 5/02 362/153.1 |
| 2008/0007430 A1 | | 1/2008 | Wang et al. |
| 2010/0277901 A1 | | 11/2010 | Farchtchian et al. |
| 2011/0121734 A1 | | 5/2011 | Pape |
| 2012/0218742 A1 | | 8/2012 | Beukema et al. |
| 2013/0170205 A1 | | 7/2013 | Abel et al. |
| 2016/0281965 A1 | * | 9/2016 | Schneider ............. B64F 1/20 |
| 2016/0327258 A1 | | 11/2016 | Sloan |
| 2017/0211247 A1 | * | 7/2017 | Messiou ............... F21V 7/04 |

FOREIGN PATENT DOCUMENTS

| | | |
|---|---|---|
| CN | 102537772 A | 7/2012 |
| CN | 202501314 U | 10/2012 |
| DE | 20 2009 009 583 U1 | 9/2009 |
| JP | 2000-228103 A | 8/2000 |
| JP | 2012-204205 A | 10/2012 |
| JP | 2016-026929 A | 2/2016 |
| JP | 2016-195072 A | 11/2016 |
| JP | 2017-054675 A | 3/2017 |
| KR | 10-0952375 B1 | 4/2010 |
| WO | 2009/077010 A1 | 6/2009 |
| WO | 2017/001158 A1 | 1/2017 |

OTHER PUBLICATIONS

U.S. Appl. No. 17/287,604, Norimasa Mizobe, filed Apr. 22, 2021, (National Stage of International Application No. PCT/JP2019/032556).
U.S. Appl. No. 17/287,609, Norimasa Mizobe, filed Apr. 22, 2021, (National Stage of International Application No. PCT/JP2019/032558).
International Search Report for PCT/JP2019/032555 dated Oct. 21, 2019.
International Search Report for PCT/JP2019/032556 dated Oct. 21, 2019.
International Search Report for PCT/JP2019/032558 dated Oct. 15, 2019.
International Search Report for PCT/JP2019/032554 dated Oct. 15, 2019 [PCT/ISA/210].
Office Action dated Nov. 15, 2021 in related U.S. Appl. No. 17/287,606.
Australian Examination Report dated Nov. 15, 2021 in Australian Patent Application No. 2019367751.
Office Action dated Dec. 7, 2021 in U.S. Appl. No. 17/287,609.
Office Action dated Dec. 3, 2021 in U.S. Appl. No. 17/287,604.
Examination Report dated Mar. 30, 2022 in Australian Application No. 2019367751.
Examination Report dated Mar. 8, 2022 in Australian Application No. 2019365599.
Office Action dated Mar. 18, 2022 in U.S. Appl. No. 17/287,609.
Extended European Search Report dated Jun. 1, 2022 in European Application No. 19876239.5.
Extended European Search Report dated Jun. 1, 2022 in European Application No. 19875490.5.
Extended European Search Report dated Jun. 3, 2022 in European Application No. 19877393.9.

* cited by examiner

RUNWAY-EMBEDDED FLASH LIGHTING DEVICE AND HEAT CONDUCTING MEMBER

CROSS REFERENCE TO RELATED APPLICATIONS

This application is a National Stage of International Application No. PCT/JP2019/032554filed Aug. 21, 2019, claiming priority based on Japanese Patent Application No. 2018-201400filed Oct. 26, 2018.

TECHNICAL FIELD

The present invention relates to a runway-embedded flash lighting device and a heat conducting member.

BACKGROUND ART

Conventionally, marker lamps for emitting marker light have been embedded under an airfield runway as a guide sign (for example, see Patent Literature 1). In the marker lamp embedded under an airfield runway, a discharge lamp containing xenon is sometimes used as a flash light source.

CITATION LIST

Patent Literature

Patent Literature 1: JP 2000-228103 A

SUMMARY OF INVENTION

Technical Problem

However, a flash lighting device using a xenon flash light source is heavy, has a short life, has a low effective luminous intensity, cannot switch the luminous intensity among high luminous intensity, medium luminous intensity, and low luminous intensity, and consumes a large amount of power. In addition, a runway-embedded flash lighting device is required to be excellent in heat dissipation of the heat generated by a flash light source.

With the foregoing in mind, it is an object of the present invention to provide a new runway-embedded flash lighting device that is light, has a long life, has high effective luminous intensity, can switch the luminous intensity, is low in power dissipation, and is excellent in heat dissipation.

Solution to Problem

In order to achieve the above object, according to one aspect of the present invention there is provided a runway-embedded flash lighting device, which includes: a cylindrical body; a ceiling member; a light guide member; an LED flash light source; and a heat conducting member, wherein the cylindrical body can be embedded in a runway, the ceiling member is placed in an upper opening of the cylindrical body in a state of being able to be exposed to a runway surface when the cylindrical body is embedded in the runway, the ceiling member is provided with a flash emission window, the light guide member is placed in the flash emission window, the LED flash light source is placed inside the cylindrical body in a state of capable of emitting flash toward the light guide member placed in the flash emission window, the light guide member allows flash emitted from the LED flash light source to be emitted to an outside from the flash emission window, the heat conducting member is placed inside the cylindrical body, a part of the heat conducting member is in contact with the LED flash light source, and at least a part of a rest of the heat conducting member is in contact with the ceiling member.

Advantageous Effects of Invention

The runway-embedded flash lighting device of the present invention is light, has a long life, has high effective luminous intensity, can switch the luminous intensity, is low in power dissipation, and is excellent in heat dissipation.

DESCRIPTION OF EMBODIMENTS

Figure 1:
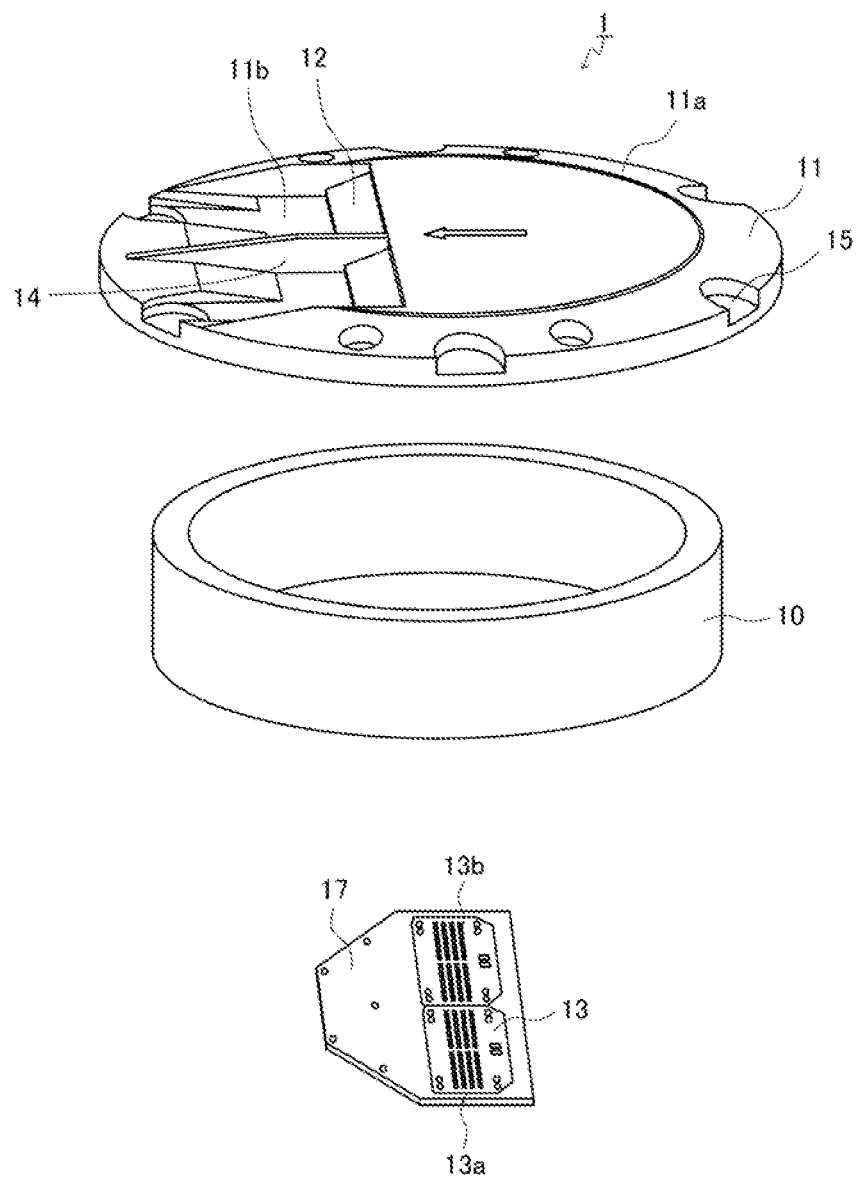
FIG. 1 is an exploded perspective view showing the configuration of an example of the runway-embedded flash lighting device according to the first example embodiment.

Next, example embodiments of the present invention will be described with reference to FIGS. 1 to 12. The present invention, however, is not limited or restricted to the following example embodiments by any means. In FIGS. 1 to 12, identical parts are indicated with identical reference signs. Regarding the descriptions of the example embodiments, reference can be made to one another. Furthermore, in the drawings, for ease of description, illustration of the structures of the components may be appropriately simplified, and the size, the ratio, and the like of components may be schematically shown and different from actual ones.

First Example Embodiment

FIG. 1 is an exploded perspective view showing the configuration of an example of the runway-embedded flash lighting device according to the present example embodiment. As shown in FIG. 1, a runway-embedded flash lighting device 1 includes a cylindrical body 10, a ceiling member 11, a light guide member 12, an LED flash light source 13, and a heat conducting member 17.

The cylindrical body 10 can be embedded in a runway 2 as will be described below with reference to FIG. 10 in the fourth example embodiment. The cylindrical body 10 may be, for example, a circular cylinder as shown in FIG. 1, or may be a cylinder other than a circular cylinder such as an elliptical cylinder or a polygonal cylinder.

The ceiling member 11 is placed in the upper opening of the cylindrical body 10 in a state of being able to be exposed to the runway surface when the cylindrical body 10 is embedded in the runway 2.

Figure 2:
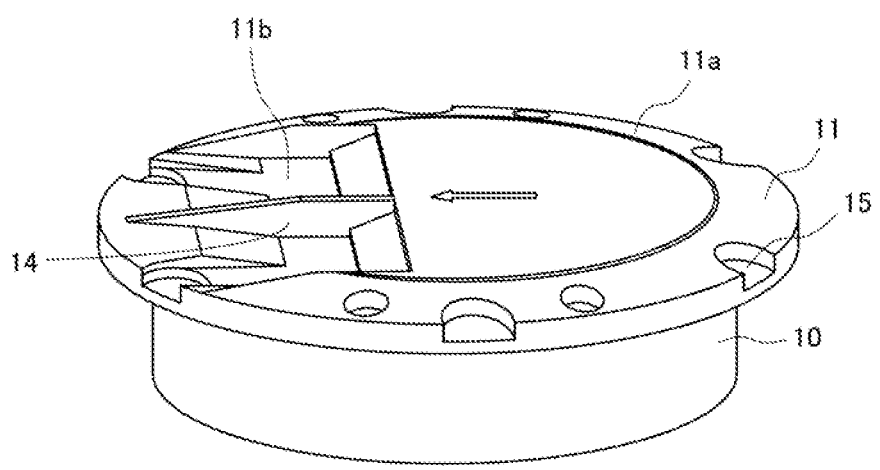
FIG. 2 is a perspective view from above showing an example of the cylindrical body and ceiling member in the runway-embedded flash lighting device according to the first example embodiment.

The cylindrical body 10 and the ceiling member 11 may be separate members as shown in FIG. 1, or may be integrally molded as an integrally molded product as shown in FIG. 2. Examples of the integrally molded product include aluminum castings, titanium castings, aluminum alloy castings, and titanium alloy castings. Among them, aluminum castings and titanium castings are preferable because they are light, and aluminum castings are particularly preferable because they are inexpensive. When the cylindrical body 10 and the ceiling member 11 are separate members, as in the case of the integrated molding product, the cylindrical body 10 and ceiling member 11 may be, for example, aluminum castings, titanium castings, aluminum alloy castings, or titanium alloy castings.

The ceiling member 11 is provided with a flash emission window, and the light guide member 12 is placed in the flash emission window. The runway-embedded flash lighting device 1 of the present example embodiment may include two or more flash emission windows, and the light guide member 12 may be placed in each of the flash emission windows, for example. If two or more light guide members 12 are used, the burden on the light guide member 12 can be further reduced and damage can be prevented. For example, as shown in FIG. 1, the flash emission window and the light guide member 12 may be divided into two or more by a reinforcing plate member 14 to be described below. The light guide member 12 may be, for example, a prism lens or the like. The material of the prism lens is not particularly limited, and may be, for example, glass or the like.

The ceiling member 11 may have a stepped structure that includes an upper ceiling portion 11a and a lower ceiling portion 11b, wherein the upper ceiling portion 11a is placed on the rear side relative to the emission direction of the flash emission window, and the lower ceiling portion 11b is placed on the emission direction side of the flash emission window, for example.

The runway-embedded flash lighting device 1 of the present example embodiment may further include the reinforcing plate member 14, and the reinforcing plate member 14 may be placed on the outer surface of the lower ceiling portion 11b in a state of standing upright in the vertical direction of the outer surface of the lower ceiling portion 11b, for example. The ceiling member 11 and the reinforcing plate member 14 may be separate members or may be integrally molded as an integrally molded product, for example. When the ceiling member 11 and the reinforcing plate member 14 are separate members, as in the case of the integrated molding product, the reinforcing plate member 14 may be, for example, aluminum castings, titanium castings, aluminum alloy castings, or titanium alloy castings.

The runway-embedded flash lighting device 1 of the present example embodiment may further include a fixing member 15, the fixing member 15 may be placed on the outer peripheral side of the ceiling member 11, and the fixing member 15 may be provided with a screw hole to be inserted with a screw for fixing to the runway 2, for example. The fixing member 15 may have a tapered shape in which the outer surface is inclined so as to be thinner toward the outer periphery, for example. The ceiling member 11 and the fixing member 15 may be, for example, separate members or may be integrally molded as an integrally molded product. When the ceiling member 11 and the fixing member 15 are separate members, as in the case of the integrated molding product, the fixing member 15 may be, for example, aluminum castings, titanium castings, aluminum alloy castings, or titanium alloy castings. At least one of the ceiling member 11 and the fixing member 15 may have a hole through which the runway-embedded flash lighting device 1 is pulled up by a tool.

Figure 3:
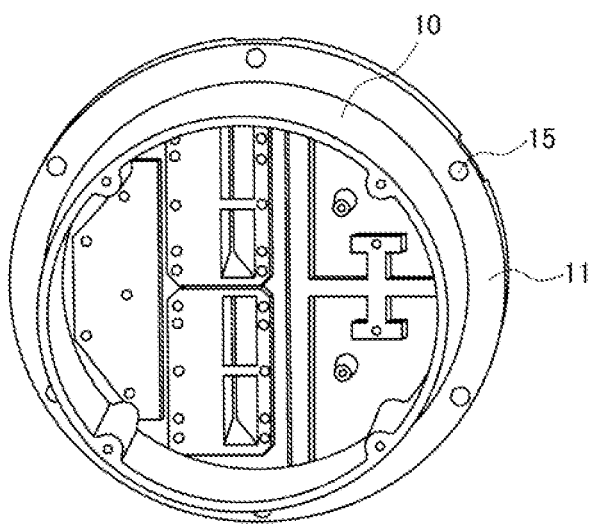
FIG. 3 is a perspective view from below showing an example of the cylindrical body and ceiling member in the runway-embedded flash lighting device according to the first example embodiment.

The LED flash light source 13 is placed inside the cylindrical body 10 in a state of capable of emitting flash toward the light guide member 12 placed in the flash emission window. FIG. 3 is a perspective view from below showing an example of the cylindrical body 10 and ceiling member 11. For example, as shown in FIG. 3, the inner surface of the ceiling member 11 (the surface on the cylindrical body 10 side) may be provided with a site to be placed with the LED flash light source 13 below the flash emission window. The light guide member 12 allows flash emitted from the LED flash light source 13 to be emitted to the outside from the flash emission window.

The LED flash light source 13 may be, for example, an LED module or the like. The
LED flash light source 13 includes a substrate 13a and an LED 13b, and the LED 13b is placed on the substrate 13a as shown in FIG. 1, for example. While the number of the LED flash light sources 13 is two in the example shown in FIG. 1, the number of LED flash light sources 13 may be one or three or more.

The conditions for mounting the LED 13b on the substrate 13a is not particularly limited, and can be appropriately set according to the desired optical properties. FIG. 1 shows an example in which 4×9=36 matrixes are two, i.e., seventy-two LEDs 13b are mounted on the substrate 13a.

Figure 6:
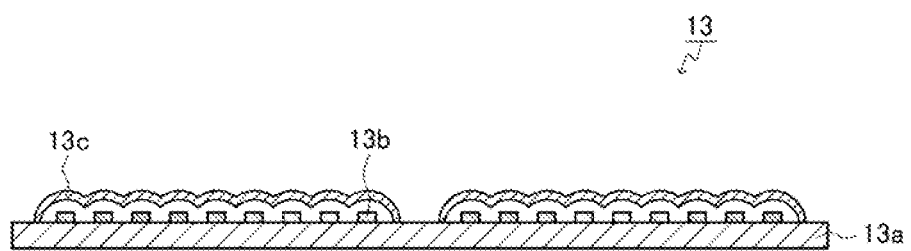
FIG. 6 is a cross-sectional view illustrating an example of the LED flash light source in the runway-embedded flash lighting device according to the first example embodiment.

The shape of the LED 13b is not particularly limited, and is generally a square shape or a rectangular shape. The size of the LED 13b is not particularly limited, and in the case of a square, the length of one side is, for example, 1.8 to 2.2 mm, 3 to 3.5 mm, or 4 to 5.3 mm, and in the case of a rectangle, the length of the short side is, for example, the same as the length of the square, and the ratio of the short side to the long side is, for example, 1:1 to 3. On the surface of the substrate 13a to which the LEDs 13b are mounted, the width between the adjacent LEDs is, for example, 0.2 to 0.5 mm The LED flash light source 13 may include a lens member 13c, the lens member 13c may be placed above the LED 13b, and the lens member 13c may be a lens member that allows the emission surface of flash emitted from the LED 13b to have a uniform illuminance distribution, for example, as shown in the partially enlarged perspective view of FIG. 5 and the cross-sectional view of FIG. 6. Examples of the lens member 13c include a fly-eye lens and an integrator lens. For example, as shown in FIG. 6, by dividing the lens member 13c into two or more pieces so as not to become too large, the burden on the lens member 13c can be further reduced and damage can be prevented. It is preferable that the lens member 13c be not too small so as not to cause loss in extraction of the emitted flash.

The heat conducting member 17 is placed inside the cylindrical body 10, wherein a part of the heat conducting member 17 is in contact with the LED flash light source 13 and at least a part of the rest of the heat conducting member 17 is in contact with the ceiling member 11. Thus, the heat generated by the LED flash light source 13 can be transmitted to the ceiling member 11 through the heat conducting member 17 to radiate heat to the outside of the device 1. The runway-embedded flash lighting device 1 of the present example embodiment is excellent in heat dissipation as compared to the case of radiating heat inside the device 1.

The heat conducting member 17 is partially in contact with the surface of the substrate 13a opposite to the LED 13b mounting side, for example, as shown in FIG. 1. At least a part of the rest of the heat conducting member 17 may be in contact with the ceiling member 11, and can be in contact with any part of the ceiling member 11. For example, as shown in FIG. 1, at least a part of the rest of the heat conducting member 17 may be in contact with the ceiling member 11 on the flash emission side relative to the flash emission window. In this aspect, for example, at least a part of the rest of the heat conducting member 17 may be in contact with the lower ceiling portion 11b. In the aspect shown in FIG. 1, the heat generated by the LED flash light source 13 can be transmitted to the flash emission side relative to the flash emission window through the heat conducting member 17, and it is possible to melt the accumulated snow that blocks the flash emission in an airfield runway in a cold region, for example. For example, as shown in FIG. 3, the inner surface of the ceiling member 11 (the surface on the cylindrical body 10 side) may be provided with a site to be placed with the heat conducting member 17 in addition to the site to be placed with the LED flash light source 13.

Figure 4:
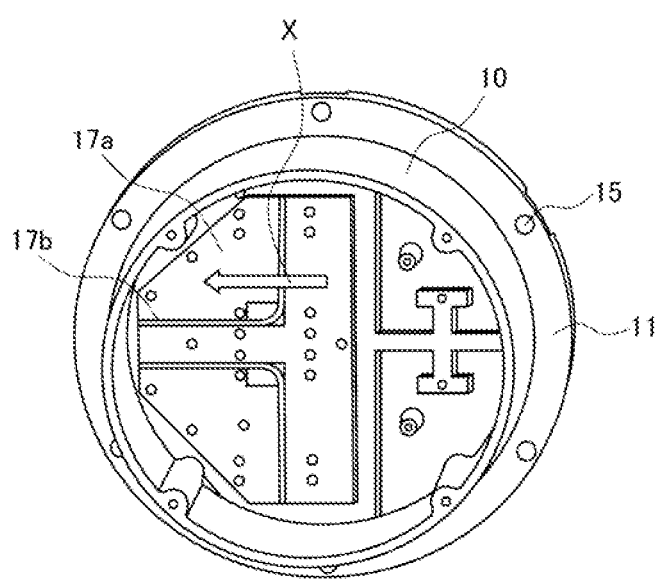
FIG. 4 is a perspective view from below showing an example of the cylindrical body, ceiling member, and heat conducting member in the runway-embedded flash lighting device according to the first example embodiment.
Figure 5:
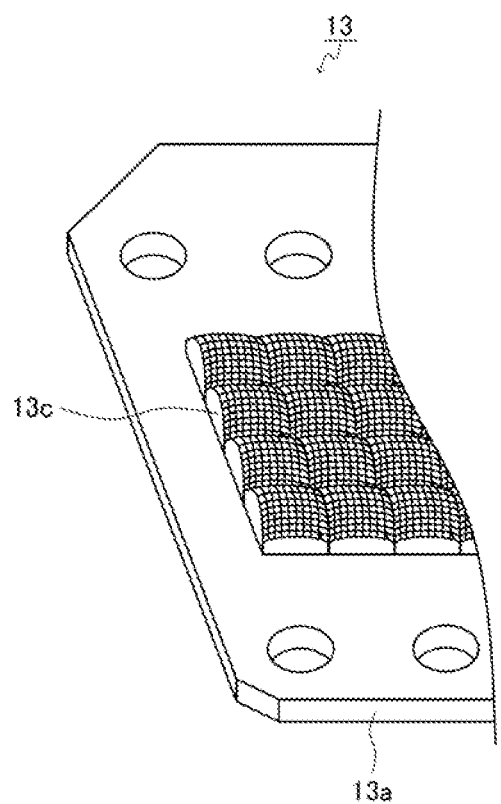
FIG. 5 is a partially enlarged perspective view showing an example of the LED flash light source in the runway-embedded flash lighting device according to the first example embodiment.

Examples of the heat conducting member 17 include a plate-like heat sink and a heat pipe, and a self-made heat conducting member or a commercially available heat conducting member may be used. Examples of the material of the plate-like heat sink include copper and aluminum. The material of the heat pipe is not particularly limited and may be a known heat conductive material, and a specific example of the material is metal or the like. Examples of the metal include aluminum and its alloys, magnesium and its alloys, iron and its alloys, copper and its alloys, titanium and its alloys, molybdenum and its alloys, and tungsten and its alloys. FIG. 4 is a perspective view from below showing an example of the cylindrical body, ceiling member, and heat conducting member in the runway-embedded flash lighting device of the present example embodiment. The heat conducting member 17 may include the plate-like heat sink 17a and the heat pipe 17b, a part of one surface of the plate-like heat sink 17a may be in contact with the LED flash light source 13, at least a part of the rest of the one surface of the plate-like heat sink 17a may be in contact with the lower ceiling portion 11b, and the heat pipe 17b may be attached to the plate-like heat sink 17a in a state where one end side of which is located on the LED flash light source 13 side and the other end side is located on the lower ceiling portion 11b side, for example. While FIG. 4 shows an example in which the heat pipe 17b is attached to the other surface of the plate-like heat sink 17a (the surface opposite to the surface (one surface) in contact with the LED flash light source 13), the heat pipe 17b may be attached to one surface of the plate-like heat sink 17a or may be attached to both of one surface and the other surface of the plate-like heat sink 17a. In the aspect shown in FIG. 4, the heat pipe 17b may be placed by, for example, soldering or the like by notching the plate-like heat sink 17a in the thickness direction and embedding it therein.

The heat pipe 17b may have a first straight portion extending in a direction perpendicular to the emission direction (arrow X direction) and a second straight portion extending in the emission direction, wherein the first straight portion and the second straight portion may be coupled to form an L-shape as a whole, the one end side may have the first straight portion, and the other end side may have the second straight portion, for example, as shown in FIG. 4.

Figure 11:
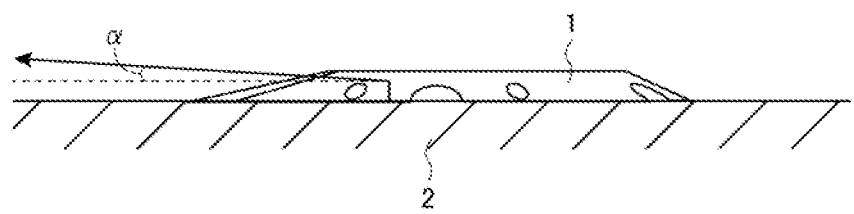
FIG. 11 is a schematic side view explaining flash emission in the runway-embedded flash lighting device according to the first example embodiment.
Figure 12:
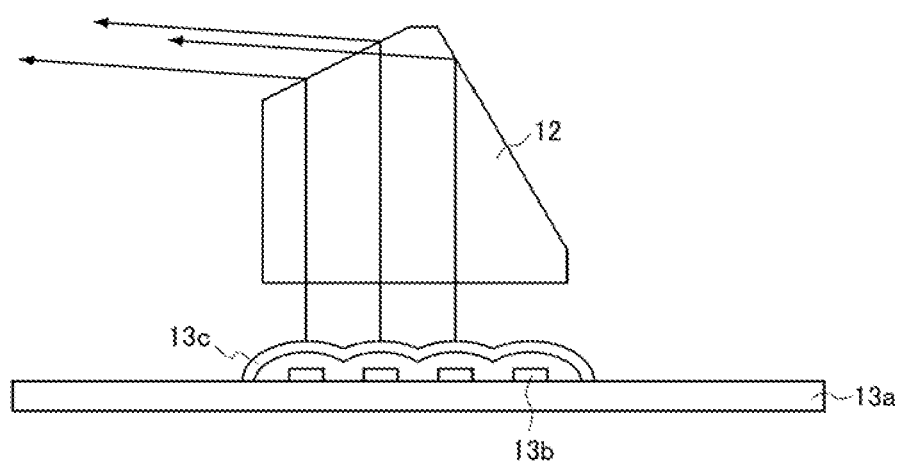
FIG. 12 is a side view showing an example of the light guide member and LED flash light source inside the runway-embedded flash lighting device shown in FIG. 11.

It is preferable that an upward flash having an angle a of about 3 degrees with respect to a direction parallel to the runway surface be emitted from the runway-embedded flash lighting device 1 of the present example embodiment, for example, as shown in FIG. 11. The light guide member 12 and the LED flash light source 13 inside the runway-embedded flash lighting device 1 shown in FIG. 11 can be shown as in FIG. 12.

While the weight of a flash lighting device using a xenon flash light source is 65 kg or less, specifically, about 40 kg, the weight of the runway-embedded flash lighting device 1 of the present example embodiment is, for example, 18 kg or less, specifically, about 11 kg. Thus, according to the present example embodiment, it is possible to provide a light runway-embedded flash lighting device.

While the lifetime of a flash lighting device using a xenon flash light source is about 500 hours, the runway-embedded flash lighting device 1 of the present example embodiment can be used indefinitely, for example. Thus, according to the present example embodiment, it is possible to provide a runway-embedded flash lighting device having a long life.

While the effective luminous intensity of a flash lighting device using a xenon flash light source is 1000 cd or more, specifically about 1200 cd, the effective luminous intensity of the runway-embedded flash lighting device 1 of the present example embodiment is, for example, 6000 cd or more, specifically about 7000 cd. Thus, according to the present example embodiment, it is possible to provide a runway-embedded flash lighting device having a high effective luminous intensity.

While a flash lighting device using a xenon flash light source cannot switch the luminous intensity among high luminous intensity, medium luminous intensity, and low luminous intensity, since the runway-embedded flash lighting device 1 of the present example embodiment has high effective luminous intensity as described above, it can switch the luminous intensity among high luminous intensity (e.g., 6000 cd or more), medium luminous intensity (e.g., 1000 cd or more), and low luminous intensity (e.g., 250 cd or more), for example. Thus, according to the present example embodiment, it is possible to provide a runway-embedded flash lighting device that can switch the luminous intensity. The high luminous intensity is used, for example, in the daytime of poor visibility due to fog, rain, or the like, the low luminous intensity is used, for example, in the night, and the medium luminous intensity is used, for example, in the evening.

While the power dissipation of a flash lighting device using a xenon flash light source is about 500 W, the power dissipation of the runway-embedded flash lighting device 1 of the present example embodiment is, for example, about 80 W (up to 114 W at high luminous intensity, 31 W at medium luminous intensity, 24 W at low luminous intensity). Thus, according to the present example embodiment, it is possible to provide a runway-embedded flash lighting device that is low in power dissipation.

Second Example Embodiment

Figure 7:
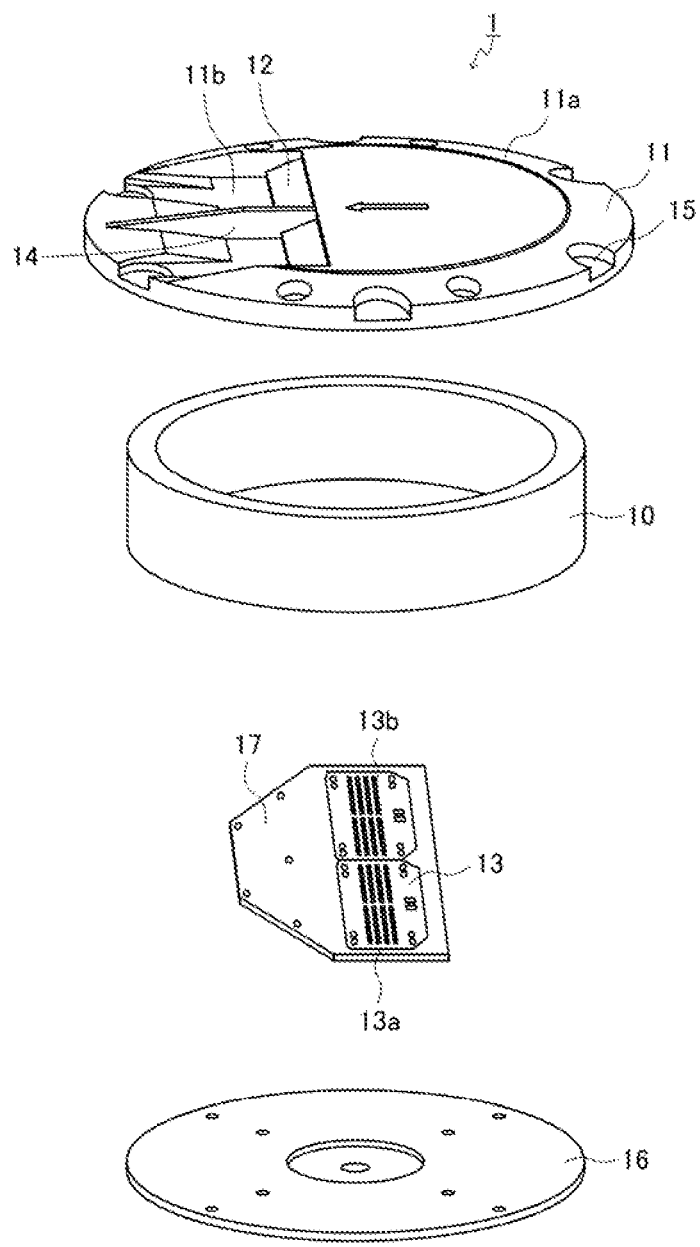
FIG. 7 is an exploded perspective view showing the configuration of an example of the runway-embedded flash lighting device according to the second example embodiment.
Figure 8:
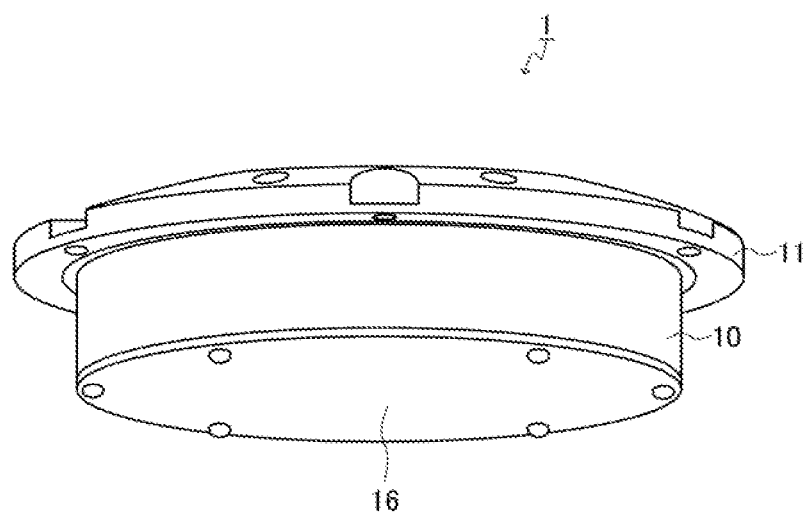
FIG. 8 is a perspective view from below showing the runway-embedded flash lighting device shown in FIG. 7.

FIG. 7 is an exploded perspective view showing the configuration of an example of the runway-embedded flash lighting device of the present example embodiment. FIG. 8 is a perspective view from below showing the runway-embedded flash lighting device shown in FIG. 7. As shown in FIGS. 7 and 8, the runway-embedded flash lighting device 1 of the present example embodiment is the same as the runway-embedded flash lighting device 1 of the first example embodiment except that it includes a bottom cover member 16.

The bottom cover member 16 is placed in a state of closing the lower opening of the cylindrical body 10. Examples of the material of the bottom cover member 16 include aluminum, titanium, aluminum alloy, titanium alloy, and castings thereof.

Figure 9:
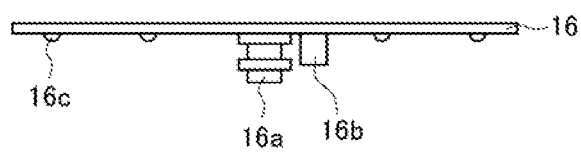
FIG. 9 is a side view showing an example of the bottom cover member of the runway-embedded flash lighting device according to the second example embodiment.

FIG. 9 is a side view showing an example of the bottom cover member 16. For example, as shown in FIG. 9, the bottom cover member 16 may include a cable gland 16a and an external ground terminal 16b. Further, when the bottom cover member 16 is attached to at least one of the cylindrical body 10 and the LED flash light source 13 with a screw 16c and an O-ring (not shown), for example, the runway-embedded flash lighting device 1 can be waterproof Third Example Embodiment According to the present invention, it is possible to provide the heat conducting member 17 for use in the runway-embedded flash lighting device 1 of the first or second example embodiment. The heat conducting member 17 of the present invention may include at least one of the plate-like heat sink 17a and the heat pipe 17b. Regarding the heat conducting member 17 of the present invention, reference can be made to the descriptions of the first and second example embodiments.

Fourth Example Embodiment

Figure 10:
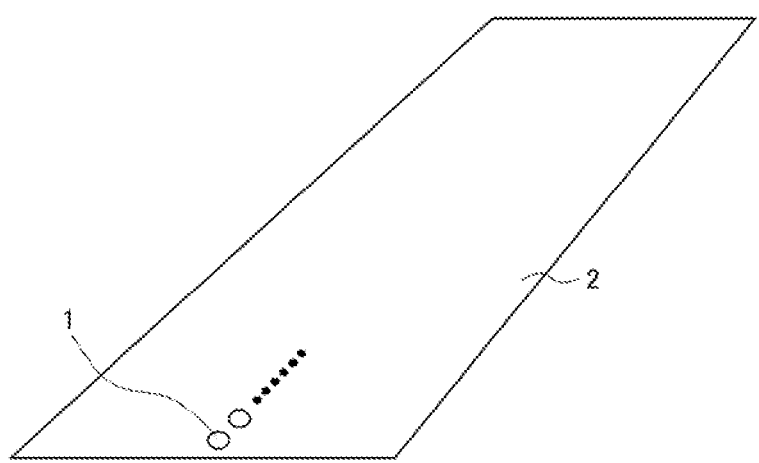
FIG. 10 is a schematic perspective view showing the configuration of an example of the runway according to the fourth example embodiment.

FIG. 10 is a schematic perspective view showing the configuration of an example of the runway of the present example embodiment. While the runway is shown schematically simplified in FIG. 10, the runway 2 is one in which the runway-embedded flash lighting device 1 of the first or second example embodiment is embedded with the ceiling member 11 exposed.

While the present invention has been described above with reference to illustrative example embodiments, the present invention is by no means limited thereto. Various changes and variations that may become apparent to those skilled in the art may be made in the configuration and specifics of the present invention without departing from the scope of the present invention.

Supplementary Notes

A part of or the whole of the above-described example embodiments can be described as the following supplementary notes. However, the present invention is by no means limited thereto.

(Supplementary Note 1)
A runway-embedded flash lighting device including:
a cylindrical body;
a ceiling member;
a light guide member;
an LED flash light source; and
a heat conducting member, wherein
the cylindrical body can be embedded in a runway,
the ceiling member is placed in an upper opening of the cylindrical body in a state of being able to be exposed to a runway surface when the cylindrical body is embedded in the runway,
the ceiling member is provided with a flash emission window,
the light guide member is placed in the flash emission window,
the LED flash light source is placed inside the cylindrical body in a state of capable of emitting flash toward the light guide member placed in the flash emission window,
the light guide member allows flash emitted from the LED flash light source to be emitted to an outside from the flash emission window,
the heat conducting member is placed inside the cylindrical body,
a part of the heat conducting member is in contact with the LED flash light source, and
at least a part of a rest of the heat conducting member is in contact with the ceiling member.
(Supplementary Note 2)
The runway-embedded flash lighting device according to Supplementary Note 1, wherein
at least a part of the rest of the heat conducting member is in contact with the ceiling member on a flash emission side relative to the flash emission window.
(Supplementary Note 3)
The runway-embedded flash lighting device according to Supplementary Note 1 or 2, wherein
the LED flash light source includes:
a substrate;
an LED; and
a lens member,
the LED is placed on the substrate,
the lens member is placed above the LED,
the lens member is a lens member that allows an emission surface of flash emitted from the LED to have a uniform illuminance distribution, and
a part of the heat conducting member is in contact with a surface of the substrate opposite to an LED mounting side.
(Supplementary Note 4)
The runway-embedded flash lighting device according to any one of Supplementary Notes 1 to 3, wherein
the ceiling member includes an upper ceiling portion and a lower ceiling portion,
the upper ceiling portion is placed on a rear side relative to an emission direction of the flash emission window,
the lower ceiling portion is placed on an emission direction side of the flash emission window, and
at least a part of the rest of the heat conducting member is in contact with the lower ceiling portion.
(Supplementary Note 5)
The runway-embedded flash lighting device according to Supplementary Note 4, further including:
a reinforcing plate member, wherein
the reinforcing plate member is placed on an outer surface of the lower ceiling portion in a state of standing upright in a vertical direction of the outer surface of the lower ceiling portion.

(Supplementary Note 6)
The runway-embedded flash lighting device according to any one of Supplementary Notes 1 to 5, wherein
the heat conducting member includes at least one of a plate-like heat sink or a heat pipe.
(Supplementary Note 7)
The runway-embedded flash lighting device according to Supplementary Note 6, wherein
the heat conducting member includes a plate-like heat sink and a heat pipe,
a part of one surface of the plate-like heat sink is in contact with the LED flash light source,
at least a part of a rest of the one surface of the plate-like heat sink is in contact with the lower ceiling portion, and
the heat pipe is attached to the plate-like heat sink in a state where one end side of which is located on an LED flash light source side and the other end side is located on a lower ceiling portion side.
(Supplementary Note 8)
The runway-embedded flash lighting device according to Supplementary Note 7, wherein
the heat pipe has a first straight portion extending in a direction perpendicular to the emission direction and a second straight portion extending in the emission direction, the first straight portion and the second straight portion are coupled to form an L-shape as a whole, the one end side has the first straight portion, and the other end side has the second straight portion.
(Supplementary Note 9)
The runway-embedded flash lighting device according to any one of Supplementary Notes 1 to 8, further including:
a fixing member, wherein
the fixing member is placed on an outer peripheral portion of the ceiling member, and
the fixing member is provided with a screw hole to be inserted with a screw for fixing to the runway.
(Supplementary Note 10)
The runway-embedded flash lighting device according Supplementary Note 9, wherein
the ceiling member and the fixing member are integrally molded as an integrally molded product.
(Supplementary Note 11)
The runway-embedded flash lighting device according to any one of Supplementary Notes 1 to 10, wherein
the cylindrical body and the ceiling member are integrally molded as an integrally molded product.
(Supplementary Note 12)
The runway-embedded flash lighting device according to any one of Supplementary Notes 1 to 11, including:
two or more flash emission windows, wherein
the light guide member is placed in each of the flash emission windows.
(Supplementary Note 13)
The runway-embedded flash lighting device according to any one of Supplementary Notes 1 to 12, further including:
a bottom cover member, wherein
the bottom cover member is placed in a state of closing a lower opening of the cylindrical body.
(Supplementary Note 14)
The runway-embedded flash lighting device according to Supplementary Note 13, wherein the bottom cover member includes a cable gland and an external ground terminal.
(Supplementary Note 15)
A heat conducting member for use in the runway-embedded flash lighting device according to any one of Supplementary Notes 1 to 14.

(Supplementary Note 16)
The heat conducting member according to Supplementary Note 15, including: at least one of a plate-like heat sink or a heat pipe.
(Supplementary Note 17)
A runway with the runway-embedded flash lighting device according to any one of Supplementary Notes 1 to 14.

This application claims priority from Japanese Patent Application No. 2018-201400 filed on Oct. 26, 2018. The entire subject matter of the Japanese Patent Application is incorporated herein by reference.

INDUSTRIAL APPLICABILITY

The present invention can provide a new runway-embedded flash lighting device that is light, has a long life, has high effective luminous intensity, can switch the luminous intensity, is low in power dissipation, and is excellent in heat dissipation.

REFERENCE SIGNS LIST

1: runway-embedded flash lighting device
2: runway
10: cylindrical body
11: ceiling member
11a: upper ceiling portion
11b: lower ceiling portion
12: light guide member
13: LED flash light source
13a: substrate
13b: LED
13c: lens member
14: reinforcing plate member
15: fixing member
16: bottom cover member
16a: cable gland
16b: external ground terminal
16c: screw
17: heat conducting member
  17a: plate-like heat sink
17b: heat pipe

The invention claimed is:
1. A runway-embedded flash lighting device, comprising:
a body;
a ceiling member;
a bottom cover member;
a light guide member;
an LED flash light source; and
a heat conducting member, wherein
the body is configured to be embedded in a runway,
the ceiling member is disposed in an upper opening of the body and configured to be exposed to a runway surface when the body is embedded in the runway,
the ceiling member has a stepped structure that includes an upper ceiling portion and a lower ceiling portion, and comprises a flash emission window,
the upper ceiling portion is disposed on a rear side relative to an emission direction of the flash emission window, and the lower ceiling portion is disposed on an emission direction side of the flash emission window,
the flash emission window and the light guide member are divided into two or more by a reinforcing plate member,
the reinforcing plate member is disposed on the outer surface of the lower ceiling portion in a state of standing upright in the vertical direction of the outer surface of the lower ceiling portion, the bottom cover member is placed in a state of closing the lower opening of the body, the light guide member is disposed in the flash emission window, the LED flash light source is disposed inside the body and configured to emit a flash toward the light guide member, the light guide member is configured to allow the flash emitted from the LED flash light source to be emitted from the flash emission window to outside the runway-embedded flash lighting device, the heat conducting member is disposed inside the body and comprises a first part and a second part, the first part of the heat conducting member is in contact with the LED flash light source, and the second part of the heat conducting member is in contact with the ceiling member.

2. The runway-embedded flash lighting device according to claim 1, wherein the second part of the heat conducting member is in contact with the ceiling member on a flash emission side relative to the flash emission window.

3. The runway-embedded flash lighting device according to claim 1, wherein the LED flash light source comprises:
a substrate;
an LED; and
a lens member,
the LED is disposed on the substrate,
the lens member is disposed above the LED,
the lens member is configured to produce an emission surface of flash emitted from the LED with a uniform illuminance distribution, and
a part of the heat conducting member is in contact with a surface of the substrate opposite to an LED mounting side of the substrate.

4. The runway-embedded flash lighting device according to claim 3, wherein the ceiling member comprises an upper ceiling portion and a lower ceiling portion,
the upper ceiling portion is disposed on a rear side relative to an emission direction of the flash emission window,
the lower ceiling portion is disposed on an emission direction side of the flash emission window, and
the second part of the heat conducting member is in contact with the lower ceiling portion.

5. The runway-embedded flash lighting device according to claim 1, wherein the heat conducting member comprises at least one of a plate-like heat sink and a heat pipe.

6. The runway-embedded flash lighting device according to claim 1, wherein the heat conducting member comprises a plate-like heat sink and a heat pipe,
a first part of one surface of the plate-like heat sink is in contact with the LED flash light source,
a second part of the one surface of the plate-like heat sink is in contact with the lower ceiling portion, and
the heat pipe is attached to the plate-like heat sink in a state where the heat pipe is located on a lower ceiling portion side of the plate-like heat sink.

7. The runway-embedded flash lighting device according to claim 6, wherein the heat pipe has a first straight portion extending in a direction perpendicular to an emission direction of the flash and a second straight portion extending in the emission direction of the flash, the first straight portion and the second straight portion are coupled to form an L-shape as a whole, the one end side comprises the first straight portion, and the other end side comprises the second straight portion.

8. The runway-embedded flash lighting device according to claim 1, further comprising:

a fixing member, wherein
the fixing member is placed on an outer peripheral portion of the ceiling member, and
the fixing member is provided with a fastener hole configured for insertion of a fastening for fixing the ceiling member to the runway.

9. A heat conducting member for use in the runway-embedded flash lighting device according to claim 1.

10. The heat conducting member according to claim 9, comprising:

at least one of a plate-like heat sink or a heat pipe.

11. The heat conducting member according to claim 1, wherein the body is cylindrical in shape.

12. The heat conducting member according to claim 8, wherein the fastener is a screw.

* * * * *